3,007,803
CASTING PLASTER
Clarence C. Clark, San Diego, Calif., and Deward V. Noble, 1516 Coolidge St., San Diego 11, Calif.; said Clark assignor to said Noble
No Drawing. Filed Jan. 29, 1958, Ser. No. 711,782
4 Claims. (Cl. 106—38.3)

The present invention relates to casting plaster for cores and more particularly to a casting plaster that can be quickly set for use and that can be quickly disseminated, or, more specifically, quickly dissolved. Specifically the present invention is highly useful in the laminated fibre glass industry where fibre glass is applied to cores and cured thereon.

The present invention contemplates a casting plaster formed of expanded vermiculite, commercial casting plaster using gypsum, and a suitable commercial modeling clay, china clay or bentonite. The vermiculite may be used in various granular forms; for example it may have a size similar to ground coffee, powder, or intermediate forms. This mixture may be of the following proportions by volume: Expanded vermiculite 7 to 13 parts, commercial casting plaster 7 to 13 parts, and approximately one part of suitable commercial molding clay. The following portions are found hightly desirable: 10 parts of expanded vermiculite, 10 parts of commercial casting plaster, and one part of modeling clay.

Expanded vermiculite of South Africa has been found most satisfactory; this material is imported and sold by Lahabralite Company, 1631 West Lincoln, Anaheim, California. The commercial casting plaster may be of the type sold by Blue Diamond Corporation or U.S. Gypsum Company. As previously stated, the modeling clay may be of the commercial type, china clay or bentonite and will be hereinafter referred to as "modeling clay."

After the expanded vermiculite, casting plaster and modeling clay are thoroughly mixed in a dry state; it is then wetted and formed into a core of the desired shape. The core is then permitted to set, which requires between twenty or thirty minutes, depending upon the size and thickness of various parts of the core. The core should then be heated to between 300 degrees to 500 degrees F. for from two to five hours depending again on the size, thickness and the degree of dryness desired in the particular type of mold.

The core thus formed is approximately one-third as heavy as other casting plaster heretofore used for cores, such as plaster of Paris. Obviously, being light in weight, it can be handled more readily, and in most instances, it can be handled by women. The cores of the present invention readily withstand the heat to which they are subjected normally when used in the fibre glass industry. Cores heretofore used tended to crack and crumble when subjected to curing temperatures.

A remarkable advantage of the present mixture lies in the fact that the core made therefrom can be readily disseminated by dissolution in water. The mixture is highly soluble in water and when so dissolved, it readily disseminates.

The cores are particularly useful in the laminated fibre glass industry. Heretofore, when using, for example, plaster of Paris, under many conditions it was difficult and sometimes impossible to remove the core without injuring or destroying the molded fibre glass after the fibre glass was cured thereon. The usual practice was to tap the finished fibre glass part sufficiently to crack and crumble the inner core. This often caused damage to the molded fibre glass. In practicing the present invention, it is necessary only to apply water to the core, and when so applied, the plaster core dissolves and disseminates quickly. Where possible, the core is made hollow so that water can be readily applied to the core substantially throughout the length thereof to thereby provide for hastening the dissolution and dissemination of the cores.

While the form of embodiment herein shown and described constitutes a preferred form, it is to be understood that other forms may be adopted falling within the scope of the claims that follow.

We claim:

1. A plaster core which is readily dissolvable in water, said plaster consisting essentially of a mixture of expanded vermiculite, casting plaster, and modeling clay in the following proportions by volume: 7–13 parts of expanded vermiculite, 7–13 parts of casting plaster, and approximately 1 part of modeling clay.

2. A plaster core according to claim 1 and characterized in that said modeling clay is bentonite.

3. A plaster core which is readily dissolvable in water, said plaster consisting essentially of a mixture of expanded vermiculite, casting plaster, and modeling clay in the following proportions by volume: approximately 10 parts of expanded vermiculite, approximately 10 parts of casting plaster, and approximately 1 part of modeling clay.

4. A process of producing a casting plaster for cores and which is readily dissolvable in water, which process comprises mixing expanded vermiculite, casting plaster, and modeling clay in the following proportions by volume: 7–13 parts of vermiculite, 7–13 parts of casting plaster, and approximately 1 part of modeling clay, adding enough water to form a flowable slurry, forming the core out of said slurry, and heating the formed core to a temperature between 300 and 500 degrees Fahrenheit for a period of from two to five hours.

References Cited in the file of this patent

UNITED STATES PATENTS

| | | |
|---|---|---|
| 1,927,102 | Sucetti | Sept. 19, 1933 |
| 2,009,146 | New | July 23, 1935 |
| 2,083,961 | New | June 15, 1937 |
| 2,197,566 | Denning | Apr. 16, 1940 |
| 2,377,491 | Goodrich et al. | June 5, 1945 |
| 2,529,835 | Dailey et al. | Nov. 14, 1950 |